United States Patent
Nakai

(10) Patent No.: US 9,742,022 B2
(45) Date of Patent: Aug. 22, 2017

(54) SOLID ELECTROLYTIC FUEL BATTERY HAVING AN INNER GAS SUPPLY PATH

(71) Applicant: Murata Manufacturing Co., Ltd., Nagaokakyo-shi, Kyoto-fu (JP)

(72) Inventor: Hideaki Nakai, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 44 days.

(21) Appl. No.: 14/668,373

(22) Filed: Mar. 25, 2015

(65) Prior Publication Data

US 2015/0200415 A1 Jul. 16, 2015

Related U.S. Application Data

(63) Continuation of application No. PCT/JP2013/075406, filed on Sep. 20, 2013.

(30) Foreign Application Priority Data

Sep. 27, 2012 (JP) .................. 2012-214246

(51) Int. Cl.
*H01M 2/38* (2006.01)
*H01M 8/2485* (2016.01)
*H01M 8/12* (2016.01)
*H01M 8/2425* (2016.01)
*H01M 8/0215* (2016.01)
*H01M 8/04089* (2016.01)

(52) U.S. Cl.
CPC ....... *H01M 8/2485* (2013.01); *H01M 8/0215* (2013.01); *H01M 8/04089* (2013.01); *H01M 8/12* (2013.01); *H01M 8/2425* (2013.01); *Y02E 60/521* (2013.01); *Y02E 60/525* (2013.01)

(58) Field of Classification Search
CPC .... H01M 8/12; H01M 8/2425; H01M 8/2485; H01M 8/04089; H01M 8/0215; Y02E 60/521; Y02E 60/525
USPC ........................................... 429/456
See application file for complete search history.

(56) References Cited

FOREIGN PATENT DOCUMENTS

| JP | H05-129033 A | 5/1993 | |
|---|---|---|---|
| JP | H06-052872 A | 2/1994 | |
| JP | 2004071308 A | * 3/2004 | |
| JP | 2004071308 A | 3/2004 | |
| WO | WO 2008/044429 A1 | 4/2008 | |
| WO | WO 2008044429 A1 | * 4/2008 | .......... H01M 8/0247 |

OTHER PUBLICATIONS

International Search Report for PCT/JP2013/075406, date of mailing Nov. 26, 2013.
Written Opinion of the International Searching Authority for PCT/JP2013/075406, date of mailing, Nov. 26, 2013.

* cited by examiner

*Primary Examiner* — Gary Harris
(74) *Attorney, Agent, or Firm* — Arent Fox LLP

(57) ABSTRACT

A solid electrolytic fuel battery having a battery structure part that includes a plurality of cells each composed of fuel electrode layers, a solid electrolytic layer, and air electrode layers. A cell separation part is arranged between the plurality of cells, and formed of a material containing ceramics. A gas supply path structure part has fuel gas supply paths to supply a fuel gas to each cell, and an air supply path to supply air to each cell. The air supply path is arranged in an inside of the battery structure part.

6 Claims, 13 Drawing Sheets

SOLID ELECTROLYTIC FUEL BATTERY HAVING AN INNER GAS SUPPLY PATH

CROSS REFERENCE TO RELATED APPLICATIONS

The present application is a continuation of International application No. PCT/JP2013/075406, filed Sep. 20, 2013, which claims priority to Japanese Patent Application No. 2012-214246, filed Sep. 27, 2012, the entire contents of each of which are incorporated herein by reference.

FIELD OF THE INVENTION

The present invention generally relates to a solid electrolytic fuel battery, and more particularly to a solid electrolytic fuel battery having supply paths for an anode gas and a cathode gas.

BACKGROUND OF THE INVENTION

In general, a flat plate solid electrolytic fuel battery (or solid oxide fuel cell (SOFC)) is composed of a plurality of flat plate cells each including an anode (negative electrode), a solid electrolyte, and a cathode (positive electrode) as power generation elements, and a separator (or internal connector) arranged between the plurality of cells. The separator is arranged between the plurality of cells to electrically connect the plurality of cells in series, and to separate gas to be supplied to each of the plurality of cells, that is, to separate a fuel gas (such as hydrogen) as an anode gas to be supplied to the anode, from an oxidant gas (such as air) as a cathode gas to be supplied to the cathode.

Conventionally, the separator is formed of a conductive ceramic material such as lanthanum chromite ($LaCrO_3$). When the separator is formed of the conductive material, only one kind of material is needed to constitute the member that fulfills the above two functions of performing the electric connection and the gas separation.

For example, JP 6-52872 A (hereinafter, referred to as Patent Document 1) discusses a structure of a sealing material for a solid electrolytic fuel battery.

According to Patent Document 1, a flat plate unit battery laminated integrally in a fuel battery is constituted by sequentially laminating a separator, a fuel electrode layer, a solid electrolytic layer, an air electrode layer, and a separator. Among four side surfaces of the unit battery in the fuel battery, a side surface serving as an air supply path is connected to an air supply manifold, a side surface serving as a fuel gas supply surface is connected to a fuel gas supply manifold, a side surface serving as a fuel gas discharge surface is connected to a fuel gas discharge manifold to discharge a fuel gas, and a side surface serving as an air discharge surface is connected to an air discharge manifold to discharge air. The separator is formed of $La(Cr\bullet Mg)O_3$ that is a conductive ceramic material. Each manifold for the gas is formed of zirconia containing an oxide of a rare earth element. The unit battery in the fuel battery and the electric insulating manifold are hermetically connected with a sealing material composed of an electric insulating ceramic material.

Patent Document 1: JP 6-52872 A

SUMMARY OF THE INVENTION

As described above, according to the flat plate solid electrolytic fuel battery in Patent Document 1, the separator is formed of the ceramic material. The separator formed of the ceramic material can be configured to roughly follow heat expansion behavior of the cell composed of the fuel electrode layer, the solid electrolytic layer, and the air electrode layer, but the separator is low in thermal conductivity. Therefore, it is difficult to dissipate heat generated during power generation to an outside through the separator. Thus, the problem is that due to the heat generated during the power generation, a temperature of the separator locally increases, and eventually a temperature in the cell locally increases.

Furthermore, when the separator and the three layers, that is, the fuel electrode layer, the solid electrolytic layer, and the air electrode layer are integrally formed, the separator absorbs the above heat as thermal expansion (thermal distortion), but the separator and the cell are difficult to deform according to this thermal expansion.

Furthermore, the separator formed of the ceramic material is high in Young's modulus, so that when the above heat is absorbed as the thermal distortion, a great thermal stress is generated in the separator. However, as described above, since the separator and the cell cannot deform according to that great thermal stress, the problem is that they are likely to be destroyed.

Therefore, when the temperatures of the separator and the cell locally increase due to the heat generated during the power generation, the separator cannot deform according to the thermal expansion caused by the heat generation, which causes the problem that the cell could be destroyed.

Thus, an object of the present invention is to provide a solid electrolytic fuel battery capable of preventing a local temperature increase in a separator and a cell even when the separator is formed of a ceramic material.

A solid electrolytic fuel battery according to the present invention includes a battery structure part, a cell separation part, and a gas supply path structure part. The battery structure part includes a plurality of cells each having an anode, a solid electrolyte, and a cathode. The cell separation part is arranged between the plurality of cells, and formed of a material containing ceramics. The gas supply path structure part has an anode gas supply path to supply an anode gas to the cells, and a cathode gas supply path to supply a cathode gas to the cells. At least one of the anode gas supply path and the cathode gas supply path is arranged in an inside of the battery structure part.

According to the solid electrolytic fuel battery in the present invention, since at least one of the anode gas supply path and the cathode gas supply path is arranged in the inside of the battery structure part, at least one of the anode gas and the cathode gas flows from the inside to an outside of the battery structure part. Therefore, it is possible to prevent a local temperature increase in the cell separation part functioning as the separator and the cell due to heat generated during power generation. As a result, a thermal stress generated in the cell separation part can be reduced, so that the cell separation part and the cell can be prevented from being destroyed.

In addition, since at least one of the anode gas and the cathode gas flows from the inside to the outside of the battery structure part, it can serve as a gas for cooling down the heat generated during the power generation. As a result, the temperature can be prevented from increasing in the inside of the battery structure part.

Furthermore, at least one of the anode and the cathode is divided by at least one of the anode gas supply path and the cathode gas supply path arranged in the inside of the battery structure part, so that points where the heat is generated during the power generation can be dispersed. As a result, the temperature can be prevented from increasing in the inside of the battery structure part.

According to the solid electrolytic fuel battery in the present invention, it is favorable that the inside of the battery structure part exists on an inner side away from a side surface of the battery structure part by more than ⅓ of a width dimension of the battery structure part.

According to the solid electrolytic fuel battery in the present invention, it is favorable that the gas supply structure part and the cell separation part are integrally formed.

In this configuration, the gas supply path structure part functioning as the manifold, and the cell separation part functioning as the separator are integrally formed, so that the two parts functioning as the separator and the manifold are continuously formed. Therefore, the sealing member needed in the conventional solid electrolytic fuel battery is not needed between the separator, and the cell and manifold. Thus, a sealing property for the gas can be enhanced in the battery as a whole, and the members can be reduced in number, so that manufacturing steps can be reduced in number.

Furthermore, according to the solid electrolytic fuel battery in the present invention, it is favorable that the gas supply structure part and the solid electrolyte are integrally formed.

In this configuration, it is not necessary to seal the parts where the gas supply path structure part is in contact with the solid electrolyte, with glass or the like.

Furthermore, according to the solid electrolytic fuel battery in the present invention, it is favorable that the cell separation part includes an electric insulator formed of ceramics for separating the anode gas from the cathode gas to be supplied to each of the plurality of cells, and an electric conductor formed in the electric insulator for electrically connecting the plurality of cells to each other.

Furthermore, according to the solid electrolytic fuel battery in the present invention, at least one of the anode gas supply path and the cathode gas supply path may include an opening extending in one direction, or include a plurality of openings arranged at intervals in one direction.

As described above, according to the present invention, even when the separator is formed of the ceramic material, it is possible to prevent a local temperature increase in the separator and a cell due to power generation, so that the separator and the cell can be prevented from being destroyed.

DETAILED DESCRIPTION OF THE INVENTION

Hereinafter, embodiments of the present invention will be described with reference to the drawings.

Figure 1:
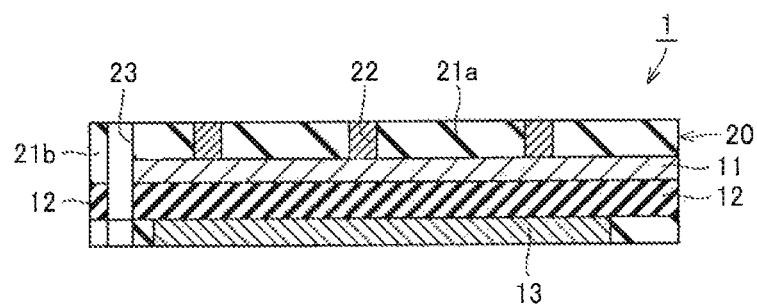
FIG. 1 is a cross-sectional view illustrating a schematic configuration of a unit module of a solid electrolytic fuel battery in an embodiment or a comparison embodiment in the present invention.
Figure 2:
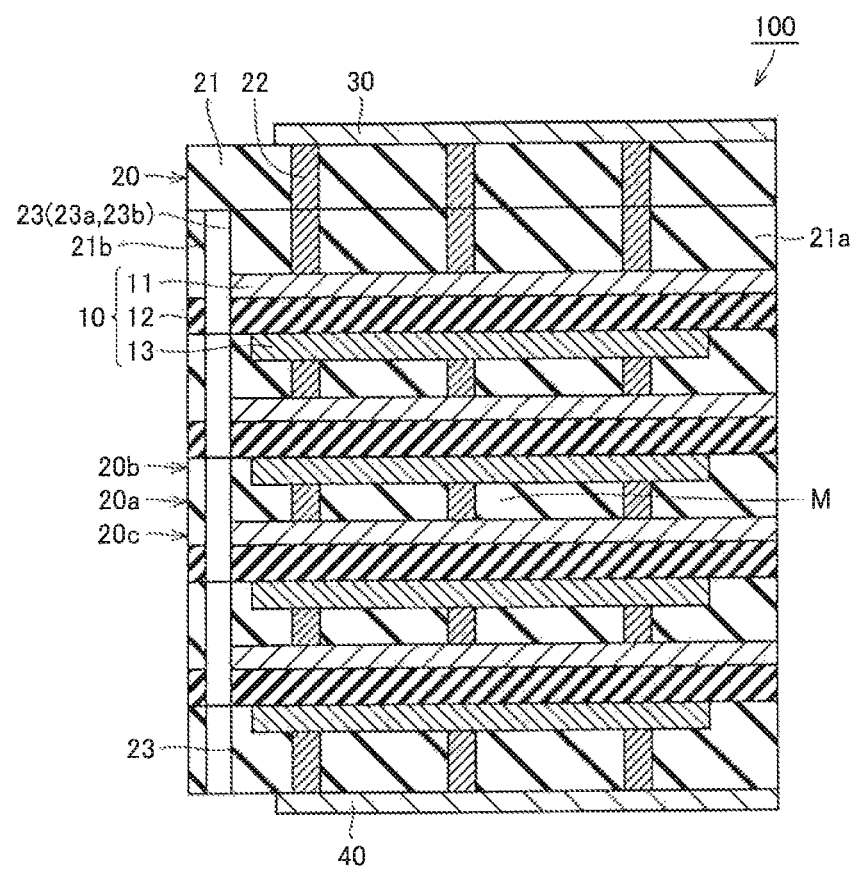
FIG. 2 is a cross-sectional view illustrating a schematic configuration of the solid electrolytic fuel battery including the plurality of unit modules in FIG. 1.

FIG. 1 is a cross-sectional view illustrating a schematic configuration of a unit module of a solid electrolytic fuel battery, according to an embodiment of the present invention. FIG. 2 is a cross-sectional view illustrating a schematic configuration of the solid electrolytic fuel battery including the plurality of unit modules in FIG. 1.

As illustrated in FIG. 1, a unit module (solid electrolytic fuel battery module) 1 of the solid electrolytic fuel battery includes a solid electrolytic fuel battery support structure (hereinafter, referred to as the "support structure") 20. On one surface of the support structure 20, a fuel electrode layer 11 serving as an anode layer having a thickness of 100 µm to 300 µm, a solid electrolytic layer 12 having a thickness of 10 µm to 50 µm, and an air electrode layer 13 serving as a cathode layer having a thickness of 100 µm to 300 µm are formed as a cell. A single battery structure part includes the cell composed of the fuel electrode layer 11, the solid electrolytic layer 12, and the air electrode layer 13. In addition, in FIG. 1, the unit module is configured such that the fuel electrode layer 11, the solid electrolytic layer 12, and the air electrode layer 13 are sequentially formed on the one surface of the support structure 20 as the battery structure part, but the unit module may be configured such that the air electrode layer 13, the solid electrolytic layer 12, and the fuel electrode layer 11 are sequentially formed.

As illustrated in FIG. 2, a solid electrolytic fuel battery 100 has a plurality of cells 10 serving as the battery structure part, and is provided such that a power collecting plate 30 having a thickness of 10 µm to 20 µm is arranged to be electrically connected to the cell provided in an uppermost position through the support structure 20, and a power collecting plate 40 having a thickness of 10 m to 20 µm is arranged to be electrically connected to the cell provided in a lowermost position through the support structure 20. Each of the cells 10 is constituted by sequentially laminating the fuel electrode layer 11, the solid electrolytic layer 12, and the air electrode layer 13. The support structure 20 includes a cell separation part 21*a* arranged between the cells 10, having a thickness of about 100 µm, and formed of a material containing ceramics, and a gas supply path structure part 21*b* formed of ceramics.

As illustrated in FIGS. 1 and 2, the cell separation part 21*a* includes an electric insulator 21 configured to separate a gas to be supplied to each of the cells, into a fuel gas serving as an anode gas, and air that is an oxidant gas serving as a cathode gas, and a plurality of electric conductors 22 formed in the electric insulator 21 to electrically connect the cells 10 to each other. The power collecting plate 30 is electrically connected to the fuel electrode layer 11 in the uppermost cell through the electric conductor 22, and the power collecting plate 40 is electrically connected to the air electrode layer 13 in the lowermost cell through the electric conductor 22.

As illustrated in FIGS. 1 and 2, a body of the gas supply path structure part 21*b* corresponding to wall parts of a fuel gas supply path 23 and an air supply path 24 is formed of ceramics that is the same electric insulator as the electric insulator 21 in the cell separation part 21*a*, and jointed to the electric insulator 21 in the cell separation part 21*a*. That is, the gas supply path structure part 21*b* and the cell separation part 21*a* are integrally formed. Furthermore, the gas supply path structure part 21*b* and the solid electrolytic layer 12 are integrally formed.

In addition, the electric insulator 21 is formed of zirconia ($ZrO_2$) stabilized by content amount 3 mol % of yttria ($Y_2O_3$) (yttria-stabilized zirconia: YSZ), or zirconia ($ZrO_2$) stabilized by content amount 12 mol % of ceria ($CeO_2$) (ceria-stabilized zirconia: CeSZ), for example. The electric conductor 22 is formed of a silver (Ag)-platinum (Pt) alloy, or silver (Ag)-palladium (Pd) alloy, for example. The solid electrolytic layer 12 is formed of zirconia ($ZrO_2$) stabilized by content amount 10 mol % of scandia ($Sc_2O_3$) and content amount 1 mol % of ceria ($CeO_2$) (scandia-ceria-stabilized zirconia: ScCeSZ), or zirconia ($ZrO_2$) stabilized by content amount 11 mol % of scandia ($Sc_2O_3$) (scandia-stabilized zirconia: ScSZ), for example. The fuel electrode layer 11 is formed of a mixture of nickel oxide (NiO), and zirconia ($ZrO_2$) stabilized by content amount 10 mol % of scandia ($Sc_2O_3$) and content amount 1 mol % of ceria ($CeO_2$) (scandia-ceria-stabilized zirconia: ScCeSZ), for example. The air electrode layer 13 is formed of a mixture of $La_{0.8}Sr_{0.2}MnO_3$, and zirconia ($ZrO_2$) stabilized by content amount 10 mol % of scandia ($Sc_2O_3$) and content amount 1 mol % of ceria ($CeO_2$) (scandia-ceria-stabilized zirconia: ScCeSZ), for example. The power collecting plates 30 and 40 are formed of silver (Ag), for example.

(First Embodiment)

Figure 3:
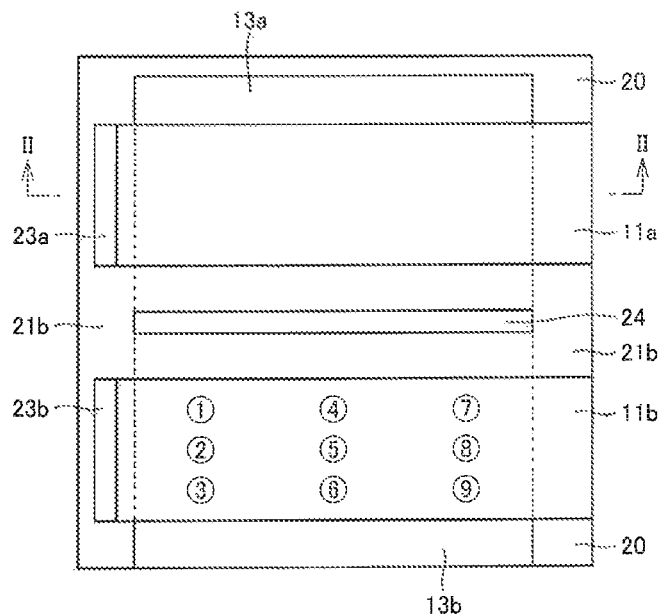
FIG. 3 is a plan view illustrating a schematic configuration of the unit module of the solid electrolytic fuel battery according to a first embodiment of the present invention.

FIG. 3 is a plan view illustrating a schematic configuration of the unit module in FIG. 1. A cross-sectional surface taken along a line II-II in FIG. 3 corresponds to FIGS. 1 and 2.

As illustrated in FIG. 3, the single cell in the battery structure part includes two fuel electrode layers 11*a* and 11*b*, and two air electrode layers 13*a* and 13*b*. The solid electrolytic layer is interposed between the two fuel electrode layers 11*a* and 11*b*, and the two air electrode layers 13*a* and 13*b* although it is not illustrated. The gas supply path structure part 21*b* serving as a part of the support structure 20 has two fuel gas supply paths 23*a* and 23*b* as the anode gas supply paths to supply the fuel gas to the cell, and one air supply path 24 as a cathode gas supply path to supply air to the cell. Each of the fuel gas supply paths 23*a* and 23*b*, and the air supply path 24 is formed of an opening extending in one direction, that is, an elongated through hole. The solid electrolytic layer having the same size as the support structure 20 has also the two fuel gas supply paths 23a and 23b and the one air supply path 24 although it is not illustrated.

The fuel gas supply path 23a is arranged so as to be in contact with a side surface of the fuel electrode layer 11a on one side (left side in FIG. 3), and the fuel gas supply path 23b is arranged so as to be in contact with a side surface of the fuel electrode layer 11b on one side (left side in FIG. 3). The air supply path 24 is interposed between the air electrode layer 13a and the air electrode layer 13b, and arranged so as to be in contact with a side surface of the air electrode layer 13a on one side (lower side in FIG. 3), and so as to be in contact with a side surface of the air electrode layer 13b on one side (upper side in FIG. 3). In this arrangement, the air supply path 24 is arranged in an inside of the battery structure part.

Referring to FIG. 3, the fuel gas flows rightward from the fuel gas supply paths 23a and 23b arranged on the left side to the fuel electrode layers 11a and 11b, respectively. The air flows upward from the air supply path 24 arranged in the inside or a center of the battery structure part to the air electrode layer 13a, and flows downward from the air supply path 24 to the air electrode layer 13b. In this way, according to the solid electrolytic fuel battery 100 in the first embodiment, the flow of the fuel gas and the flow of the air intersect with each other.

Figure 4A:
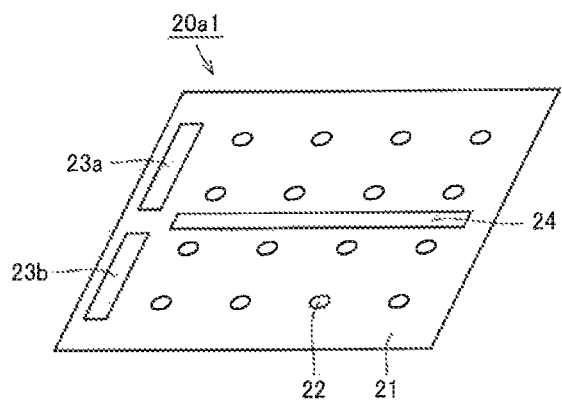
FIGS. 4A and 4B are perspective views each partially illustrating a support structure including a cell separation part, and anode and cathode gas supply paths in the first embodiment of the present invention.
Figure 4B:
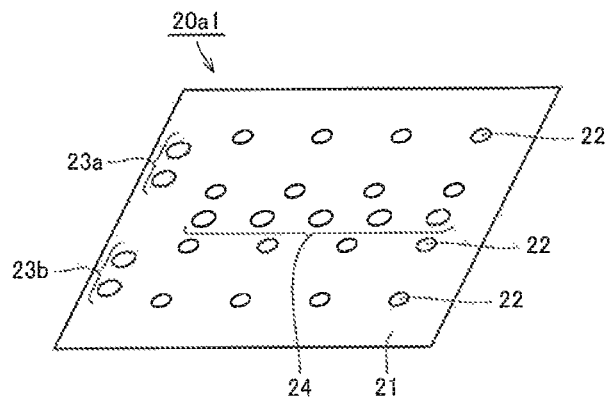

FIGS. 4A and 4B each illustrates a part 20a1 constituting a part 20a of the support structure 20 illustrated in FIG. 2. As illustrated in FIG. 4A, the part 20a1 has the two fuel gas supply paths 23a and 23b and one air supply path 24. Each of the fuel gas supply paths 23a and 23b and the air supply path 24 is formed of the opening extending in one direction, that is, the elongated through hole. As a variation, as illustrated in FIG. 4B, each of the fuel gas supply paths 23a and 23b and the air supply path 24 may be formed of a plurality of openings arranged at intervals in one direction, that is, a plurality of circular through holes.

(Second Embodiment)

Figure 12:
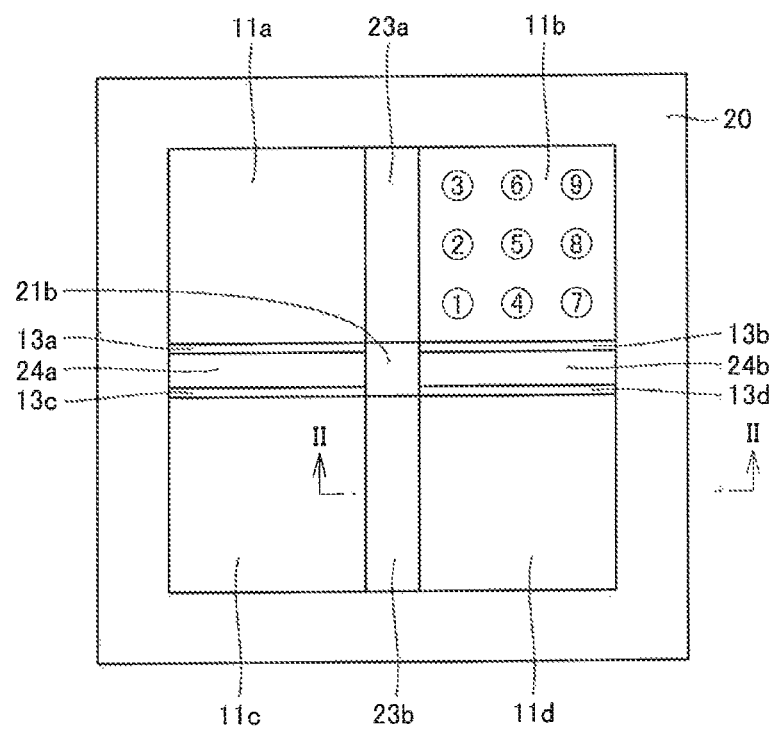
FIG. 12 is a plan view illustrating a schematic configuration of a unit module of a solid electrolytic fuel battery according to a second embodiment of the present invention.

FIG. 12 is a plan view illustrating a schematic configuration of the unit module in FIG. 1. A cross-sectional surface taken along a line II-II in FIG. 12 corresponds to FIGS. 1 and 2.

As illustrated in FIG. 12, a single cell constituting a battery structure part includes four fuel electrode layers 11a, 11b, 11c, and 11d and four air electrode layers 13a, 13b, 13c, and 13d. A solid electrolytic layer is interposed between the four fuel electrode layers 11a, 11b, 11c, and 11d and the four air electrode layers 13a, 13b, 13c, and 13d although it is not illustrated. A gas supply path structure part 21b serving as a part of a support structure 20 has two fuel gas supply paths 23a and 23b as anode gas supply paths to supply a fuel gas to the cell, and two air supply paths 24a and 24b as cathode gas supply paths to supply air to the cell. Each of the fuel gas supply paths 23a and 23b, and the air supply paths 24a and 24b is formed of an opening extending in one direction, that is, an elongated through hole. The solid electrolytic layer having the same size as the support structure 20 has also the two fuel gas supply paths 23a and 23b and the two air supply paths 24a and 24b although it is not illustrated.

The fuel gas supply path 23a is interposed between the fuel electrode layer 11a and the fuel electrode layer 11b, and arranged so as to be in contact with a side surface of the fuel electrode layer 11a on one side (right side in FIG. 12), and so as to be in contact with a side surface of the fuel electrode layer 11b on one side (left side in FIG. 12). The fuel gas supply path 23b is interposed between the fuel electrode layer 11c and the fuel electrode layer 11d, and arranged so as to be in contact with a side surface of the fuel electrode layer 11c on one side (right side in FIG. 12), and so as to be in contact with a side surface of the fuel electrode layer 11d on one side (left side in FIG. 12). In this arrangement, the fuel gas supply path 23 is arranged in an inside of the battery structure part.

The air supply path 24a is interposed between the air electrode layer 13a and the air electrode layer 13c, and arranged so as to be in contact with a side surface of the air electrode layer 13a on one side (lower side in FIG. 12), and so as to be in contact with a side surface of the air electrode layer 13c on one side (upper side in FIG. 12). The air supply path 24b is interposed between the air electrode layer 13b and the air electrode layer 13d, and arranged so as to be in contact with a side surface of the air electrode layer 13b on one side (lower side in FIG. 12), and so as to be in contact with a side surface of the air electrode layer 13d on one side (upper side in FIG. 12). In this arrangement, the air supply path 24 is arranged in the inside of the battery structure part.

Referring to FIG. 12, the fuel gas flows rightward and leftward from the fuel gas supply paths 23a and 23b arranged in the inside or the center of the battery structure part, to the fuel electrode layers 11a and 11b, and 11c and 11d, respectively. The air flows upward and downward from the air supply paths 24a and 24b arranged in the inside or the center of the battery structure part, to the air electrode layers 13a and 13b, and 13c and 13d, respectively. In this way, according to a solid electrolytic fuel battery 100 in the second embodiment, the flow of the fuel gas and the flow of the air intersect with each other.

Figure 13A:
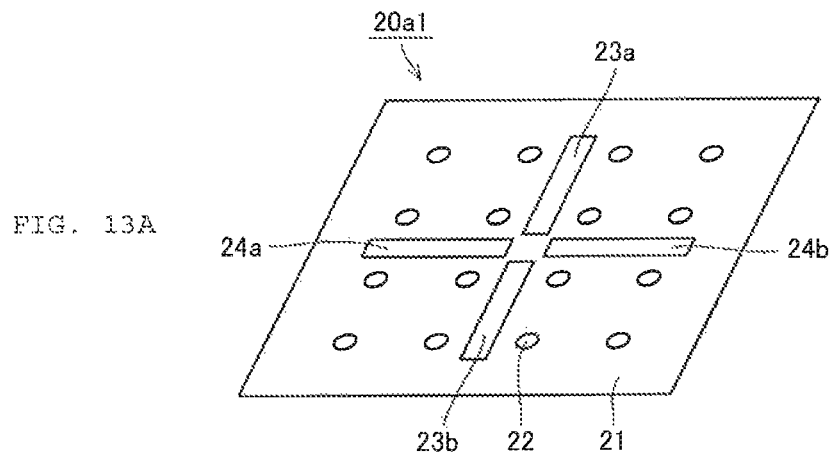
FIGS. 13A and 13B are perspective views each partially illustrating a support structure including a cell separation part, and anode and cathode gas supply paths in the second embodiment of the present invention.
Figure 13B:
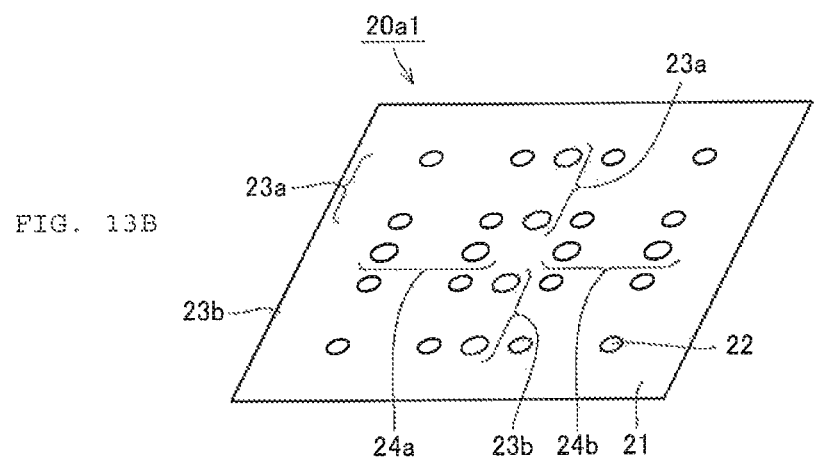

FIG. 13A and FIG. 13B each illustrates a part 20a1 constituting the part 20a of the support structure 20 illustrated in FIG. 2. As illustrated in FIG. 13A, the part 20a1 has the two fuel gas supply paths 23a and 23b and two air supply paths 24a and 24b. Each of the fuel gas supply paths 23a and 23b and the air supply paths 24a and 24b is formed of an opening extending in one direction, that is, an elongated through hole. As a variation, as illustrated in FIG. 13B, each of the fuel gas supply paths 23a and 23b and the air supply paths 24a and 24b may be formed of a plurality of openings arranged at intervals in one direction, that is, a plurality of circular through holes.

According to the solid electrolytic fuel battery 100 configured as described above, at least one of the fuel gas supply paths 23a and 23b, and the air supply paths 24a and 24b are arranged in the inside of the battery structure part, so that at least one of the fuel gas and the air flows outward from the inside of the battery structure part. Therefore, it is possible to prevent a local temperature increase in the cell separation part 21a functioning as the separator and the cell due to heat generated during power generation. Thus, a heat stress generated in the cell separation part 21a can be reduced, so that the cell separation part 21a and the cell can be prevented from being destroyed.

In addition, since at least one of the fuel gas and the air flows outward from the inside of the battery structure part, it works as a gas for cooling down the heat generated during the power generation. Therefore, the temperature increase can be prevented in the inside of the battery structure part.

Furthermore, since at least one of the fuel electrode layers 11a to 11d and the air electrode layers 13a to 13d can be divided by at least one of the fuel gas supply paths 23a and 23b, and the air supply paths 24, 24a, and 24b arranged in the inside of the battery structure part, so that points where the heat is generated during the power generation can be dispersed. As a result, the temperature can be prevented from increasing in the inside of the battery structure part.

According to the solid electrolytic fuel battery 100 in the present invention, the gas supply path structure part 21b and the cell separation part 21a are integrally formed. According to this configuration, the gas supply path structure part 21b functioning as the manifold, and the cell separation part 21a functioning as the separator are integrally formed, so that the parts functioning as the separator and the manifold are continuously formed. Therefore, the sealing member needed in the conventional solid electrolytic fuel battery is not needed between the separator, and between the cell and manifold. Thus, a sealing property for the gas can be enhanced in the battery as a whole, and the members can be reduced in number, so that manufacturing steps can be reduced in number.

Furthermore, according to the solid electrolytic fuel battery 100 in the present invention, the gas supply path structure part 21b and the solid electrolytic layer 12 are integrally formed. According to this configuration, it is not necessary to seal a part where the gas supply path structure part 21b is in contact with the solid electrolytic layer 12, with glass or the like.

EXAMPLES

Hereinafter, a description will be given to first and second working examples for manufacturing the solid electrolytic fuel battery according to the present invention, and a comparison example for manufacturing a solid electrolytic fuel battery to be compared with the structure of the present invention.

First Working Example

First, material powder for each member constituting the unit module of the solid electrolytic fuel battery in the first embodiment illustrated in FIGS. 1 to 3 was prepared as follows.

Fuel electrode layers 11a and 11b: a mixture of 60 wt. % of nickel oxide (NiO), and 40 wt. % of zirconia ($ZrO_2$) stabilized by content amount 10 mol % of scandia ($Sc_2O_3$) and content amount 1 mol % ceria ($CeO_2$) (scandia-ceria-stabilized zirconia: ScCeSZ).

Solid electrolytic layer 12: zirconia ($ZrO_2$) stabilized by content amount 10 mol % of scandia ($Sc_2O_3$) and content amount 1 mol % of ceria ($CeO_2$) (scandia-ceria-stabilized zirconia: ScCeSZ).

Air electrode layer 13a, 13b: mixture of 60 wt. % of $La_{0.8}Sr_{0.2}MnO_3$, and 40 wt. % of zirconia ($ZrO_2$) stabilized by content amount 10 mol % scandia ($Sc_2O_3$) and content amount 1 mol % of ceria ($CeO_2$) (scandia-ceria-stabilized zirconia: ScCeSZ).

For the part 20a, a part 20b, and a part 20c (FIG. 2) in the solid electrolytic fuel battery support structure 20 illustrated in FIG. 1, following material powder was prepared to make an electric insulating material.

The powder was prepared by adding 10 wt. % of zircon ($ZrSiO_4$) to zirconia ($ZrO_2$) stabilized by content amount 12 mol % of ceria ($CeO_2$) (ceria-stabilized zirconia: CeSZ).

Figure 7:
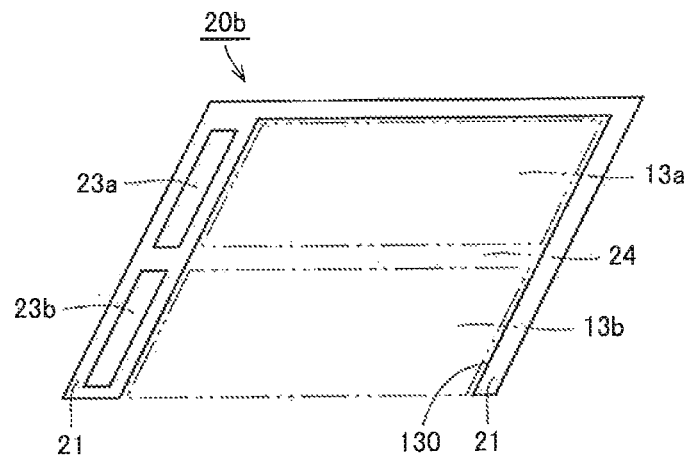
FIG. 7 is a perspective view partially illustrating a support structure including the anode gas supply path in the first embodiment of the present invention.
Figure 8:
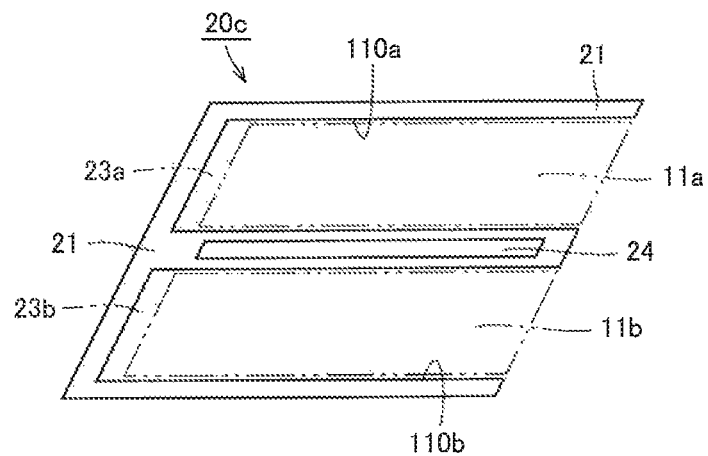
FIG. 8 is a perspective view partially illustrating a support structure including the cathode gas supply path in the first embodiment of the present invention.

With the material prepared as described above, first, as illustrated in FIG. 2, green sheets having three kinds of shapes were made for the parts 20a, 20b, and 20c constituting the solid electrolytic fuel battery support structure 20 as follows. The part 20a was made by sequentially laminating a part 20a2 (refer to FIG. 5), a part 20a1 (refer to FIG. 4A), and a part 20a3 (FIG. 6), from a bottom. The part 20b is illustrated in FIG. 7. The part 20c is illustrated in FIG. 8.

For the parts 20a1, 20a2, and 20a3, green sheets were made for the parts 20a1, 20a2, and 20a3 in the solid electrolytic fuel battery support structure 20 by doctor blade method after mixing the electric insulating material power, a polyvinyl butyral binder, and a mixture of ethanol and toluene (mixture ratio is 1:4 in weight ratio) as an organic solvent.

Figure 5:
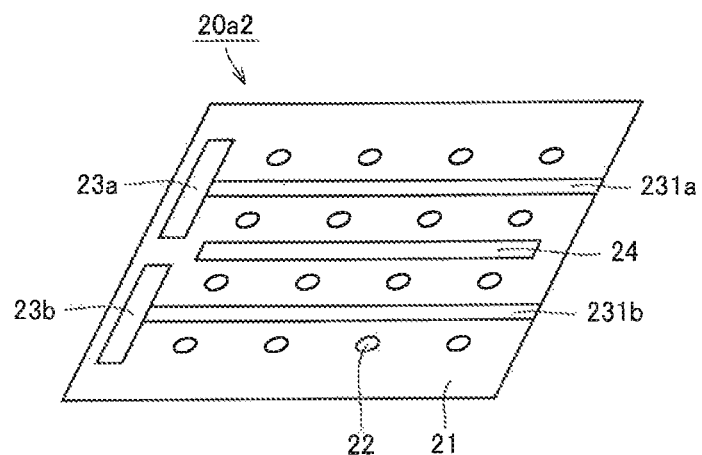
FIG. 5 is a perspective view partially illustrating a support structure including the cell separation part, the anode gas supply path, and a flow path in the first embodiment of the present invention.
Figure 6:
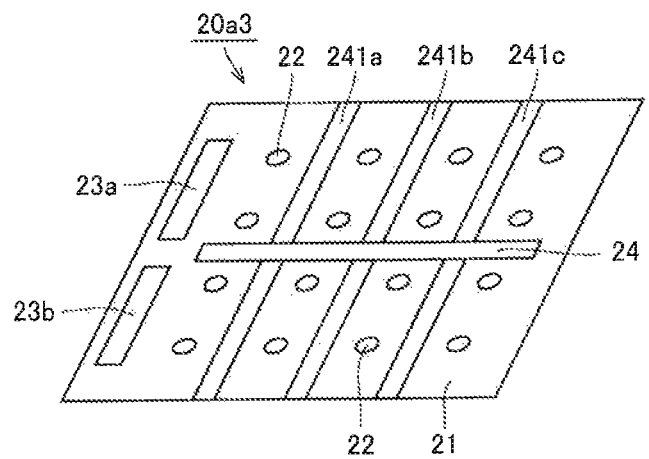
FIG. 6 is a perspective view partially illustrating a support structure including the cell separation part, the anode gas supply path, and a flow path in the first embodiment of the present invention.

In the green sheets for the parts 20a1, 20a2, and 20a3, as illustrated in FIGS. 4A, 5, and 6, through holes were formed to form the plurality of electric conductors 22 in the electric insulator 21. By filling the through holes with paste composed of 50 wt. % of silver and 50 wt. % of palladium, a conductive paste filled layer was made to form the electric conductor 22.

Furthermore, as illustrated in FIGS. 4A, 5, and 6, in the parts 20a1, 20a2, and 20a3, elongated through holes were formed to form the fuel gas supply paths 23a and 23b and the air supply path 24.

In the green sheet of the part 20a2, as illustrated in FIG. 5, fuel gas flow path formation layers 231a and 231b were formed of polyethylene terephthalate (PET) to be connected to the through holes to form the fuel gas supply paths 23a and 23b. After these fuel gas flow path formation layers 231a and 231b have disappeared after firing, they are connected to the fuel gas supply paths 23a and 23b to supply the fuel gas, and become fuel gas flow paths to send the fuel gas to the fuel electrode layers 11a and 11b.

In the green sheet of the part 20a3, as illustrated in FIG. 6, air flow path formation layers 241a, 241b, and 241c were formed of polyethylene terephthalate (PET) to be connected to the through holes to form the air supply path 24. After these air flow path formation layers 241a, 241b, and 241c have disappeared after firing, they are connected to the air supply path 24 to supply the air, and become air flow paths to send the air to the air electrode layers 13a and 13b.

For the part 20b, the green sheet of the part 20b in the solid electrolytic fuel battery support structure 20 was made by doctor blade method after mixing the electric insulating material power, a polyvinyl butyral binder, and a mixture of ethanol and toluene (mixture ratio is 1:4 in weight ratio) as an organic solvent.

For the green sheet of the part 20b, a roughly U-shaped sheet of the electric insulator 21 was formed as illustrated in FIG. 7 so that the green sheet of the air electrode layers 13a and 13b can fit with a space left for the air supply path 24 illustrated in FIG. 3. In addition, elongated through holes were formed in the green sheet of the part 20b to form the fuel gas supply paths 23 (23a and 23b) in the electric insulator 21 as illustrated in FIGS. 2 and 3.

Thus, for the part 20c, the green sheet of the part 20c in the solid electrolytic fuel battery support structure 20 was made by doctor blade method after mixing the electric insulating material power, a polyvinyl butyral binder, and a mixture of ethanol and toluene (mixture ratio is 1:4 in weight ratio) as an organic solvent.

For the green sheet of the part 20c, a roughly W-shaped sheet of the electric insulator 21 was formed as illustrated in FIG. 8 so that the green sheet of the fuel electrode layers 11a and 11b can fit with a space left for the fuel gas supply paths 23a and 23b illustrated in FIG. 3. In addition, an elongated through hole was formed in the green sheet of the part 20c to form the air supply path 24 in the electric insulator 21 as illustrated in FIG. 3.

Subsequently, green sheets were made for the air electrode layers 13a and 13b and the fuel electrode layers 11a and 11b illustrated in FIG. 3, and the solid electrolytic layer 12 illustrated in FIGS. 1 and 2 as follows.

The green sheets of the fuel electrode layers 11a and 11b and the air electrode layers 13a and 13b were made by doctor blade method after mixing the respective material powder for the fuel electrode layers 11a and 11b and the air electrode layers 13a and 13b, a polyvinyl butyral binder, and a mixture of ethanol and toluene (mixture ratio is 1:4 in weight ratio) as an organic solvent.

The green sheet of the solid electrolytic layer 12 was made by doctor blade method after mixing the material power of the solid electrolytic layer 12, a polyvinyl butyral binder, and a mixture of ethanol and toluene (mixture ratio is 1:4 in weight ratio) as an organic solvent.

Figure 9:
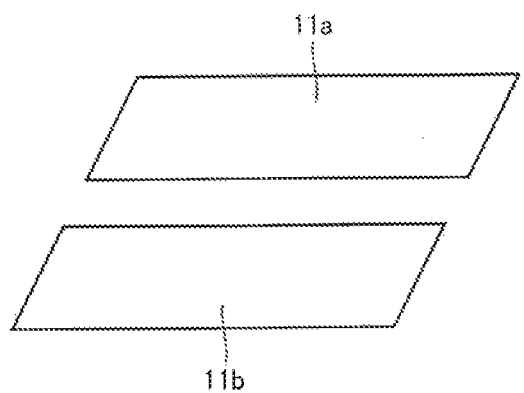
FIG. 9 is a perspective view illustrating a fuel electrode layer in the first embodiment of the present invention.
Figure 10:
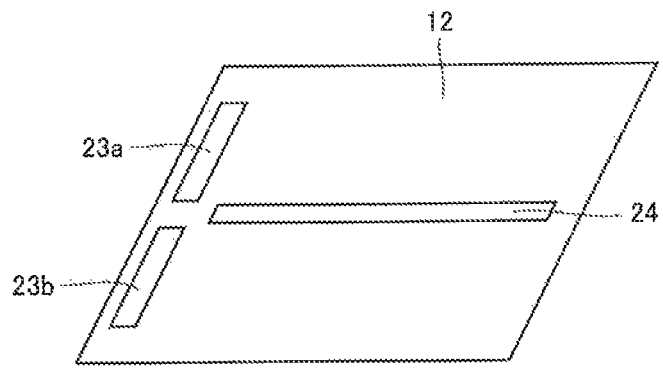
FIG. 10 is a perspective view illustrating a solid electrolytic layer in the first embodiment of the present invention.
Figure 11:
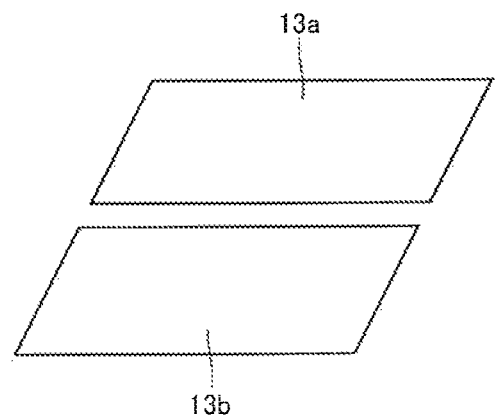
FIG. 11 is a perspective view illustrating an air electrode layer in the first embodiment of the present invention.

More specifically, the green sheet of the fuel electrode layers 11a and 11b having a shape illustrated in FIG. 9 was made, the green sheet of the solid electrolytic layer 12 having a shape illustrated in FIG. 10 was made, and the green sheet of the air electrode layers 13a and 13b having a shape illustrated in FIG. 11 was made. In addition, elongated through holes were formed in the green sheet of the solid electrolytic layer 12 as illustrated in FIG. 10 to form the fuel gas supply paths 23a and 23b and the air supply path 24.

The green sheets of the parts 20c, 20a, and 20b in the solid electrolytic fuel battery support structure 20 made as described above were sequentially laminated, and the green sheets of the air electrode layers 13a and 13b, the solid electrolytic layer 12, and the fuel electrode layers 11a and 11b were further sequentially laminated to fit in them. After that, the four solid electrolytic fuel battery unit modules each composed of the solid electrolytic fuel battery support structure 20 (thickness of the cell separation part 21a after firing: 100 μm), the air electrode layer 13 (thickness after firing: 200 μm), the solid electrolytic layer 12 (thickness after firing: 20 μm), and the fuel electrode layer 11 (thickness after firing: 200 μm) were laminated, and the part 20a of the solid electrolytic fuel battery support structure 20 not having the gas supply path was laminated on the top. This laminated body was pressed by cold isostatic processing at a pressure of 1000 kgf/cm², a temperature of 80° C. for two minutes. This pressed body was subjected to a degreasing process at a temperature within a range of 400° C. to 500° C., and then held at a temperature within a range of 1300° C. to 1400° C. for two hours to be fired. In this way, the sample of the solid electrolytic fuel battery in the first working example (plane area: 85 mm×85 mm) was made.

Then, as illustrated in FIG. 2, the power collecting plates 30 and 40 each made of silver and having a thickness of 20 μm were fixed onto the upper surface and the lower surface, respectively of the sample of the solid electrolytic fuel battery made as described above in the first working example.

Second Working Example

First, material powder were prepared for the fuel electrode layers 11a to 11d, solid electrolytic layer 12, the air electrode layers 13a to 13b, and parts 20a to 20c as members constituting the unit module of the solid electrolytic fuel battery in the second embodiment illustrated in FIGS. 1, 2, and 12, similar to the first working example.

Figure 16:
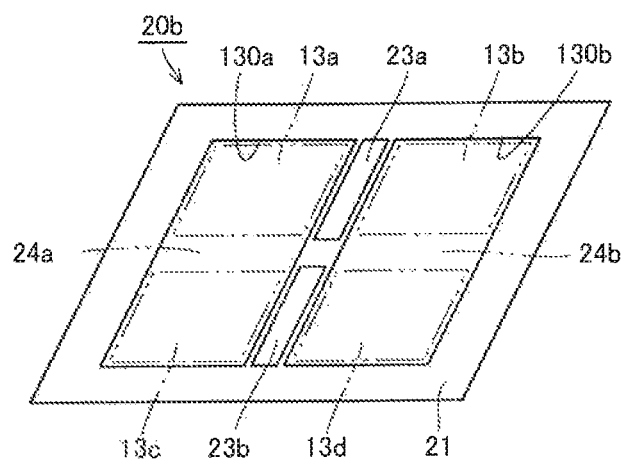
FIG. 16 is a perspective view partially illustrating a support structure including the anode gas supply path in the second embodiment of the present invention.
Figure 17:
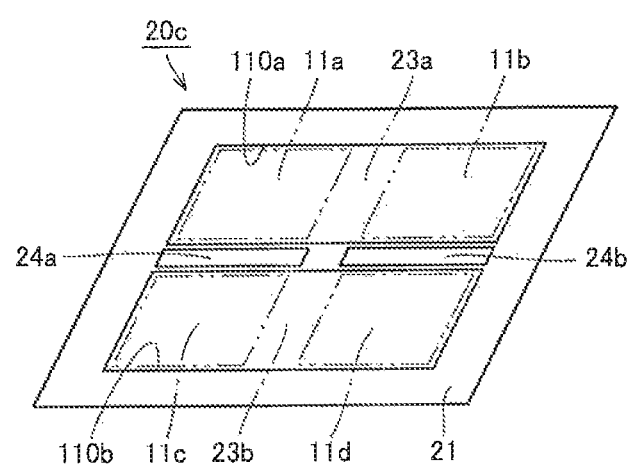
FIG. 17 is a perspective view partially illustrating a support structure including the cathode gas supply path in the second embodiment of the present invention.

With the material prepared as described above, first, green sheets having three kinds of shapes were made as follows for the parts 20a, 20b, and 20c constituting the solid electrolytic fuel battery support structure 20 as illustrated in FIG. 2. The part 20a was constituted by sequentially laminating a part 20a2 (refer to FIG. 14), a part 20a1 (refer to FIG. 13A), and a part 20a3 (FIG. 15), from a bottom. The part 20b is illustrated in FIG. 16. The part 20c is illustrated in FIG. 17.

The green sheets of the parts 20a1, 20a2, and 20a3 were made similar to the first working example.

Figure 14:
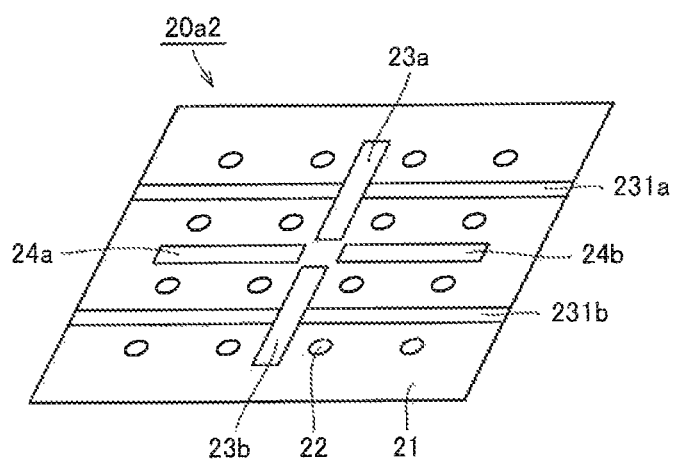
FIG. 14 is a perspective view partially illustrating a support structure including the cell separation part, the anode gas supply path, and a flow path in the second embodiment of the present invention.
Figure 15:
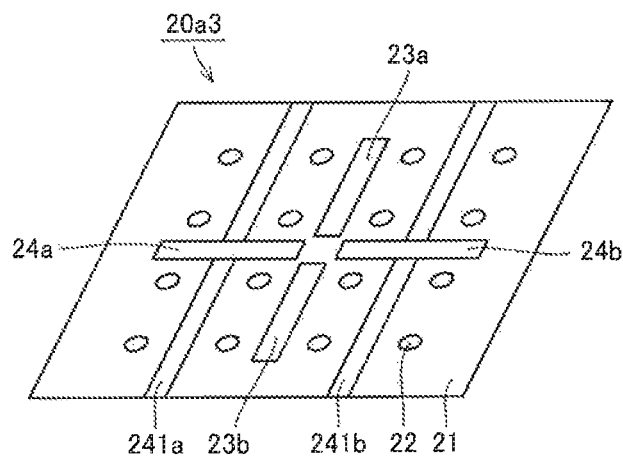
FIG. 15 is a perspective view partially illustrating a support structure including the cell separation part, the cathode gas supply path, and a flow path in the second embodiment of the present invention.

In the green sheets of the parts 20a1, 20a2, and 20a3, as illustrated in FIGS. 13A, 14, and 15, a conductive paste filled layer was made to form each of the electric conductors 22 in the electric insulator 21, similar to the first working example.

Furthermore, as illustrated in FIGS. 13A, 14, and 15, in the parts 20a1, 20a2, and 20a3, elongated through holes were formed to form the fuel gas supply paths 23a and 23b and the air supply paths 24a and 24b.

In the green sheet of the part 20a2, as illustrated in FIG. 14, fuel gas flow path formation layers 231a and 231b were formed of polyethylene terephthalate (PET) to be connected to the through holes to form the fuel gas supply paths 23a and 23b. After these fuel gas flow path formation layers 231a and 231b have disappeared after firing, they are connected to the fuel gas supply paths 23a and 23b to supply the fuel gas, and become fuel gas flow paths to send the fuel gas to the fuel electrode layers 11a to 11d.

In the green sheet of the part 20a3, as illustrated in FIG. 15, air flow path formation layers 241a and 241b were formed of polyethylene terephthalate (PET) to be connected to the through holes to form the air supply paths 24a and 24b. After these air flow path formation layers 241a and 241b have disappeared after firing, they are connected to the air supply paths 24a and 24b to supply the air, and become air flow paths to send the air to the air electrode layers 13a to 13d.

Then, the green sheet of the part 20b was made similar to the first working example.

For the green sheet of the part 20b, a sheet of the electric insulator 21 having a shape illustrated in FIG. 16 was formed so that the green sheet of the air electrode layers 13a to 13d can fit with a space left for the air supply paths 24a and 24b illustrated in FIG. 12. In addition, elongated through holes were formed in the green sheet of the part 20b to form the fuel gas supply paths 23 (23a and 23b) in the electric insulator 21 as illustrated in FIGS. 2 and 12.

Thus, the green sheet of the part 20c was made similar to the first working example.

For the green sheet of the part 20c, a sheet of the electric insulator 21 having a shape illustrated in FIG. 17 was formed so that the green sheet of the fuel electrode layers 11a to 11d can fit with a space left for the fuel gas supply paths 23a and 23b illustrated in FIG. 12. In addition, elongated through holes were formed in the green sheet of the part 20c to form the air supply paths 24a and 24b in the electric insulator 21 as illustrated in FIG. 12.

Subsequently, green sheets were made for the air electrode layers 13a to 13d and the fuel electrode layers 11a to 11d illustrated in FIG. 12, and the solid electrolytic layer 12 illustrated in FIGS. 1 and 2, similar to the first working example.

Figure 18:
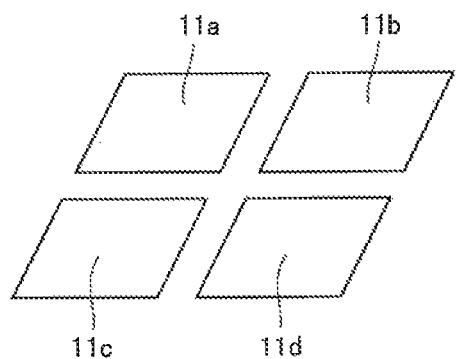
FIG. 18 is a perspective view illustrating a fuel electrode layer in the second embodiment of the present invention.
Figure 19:
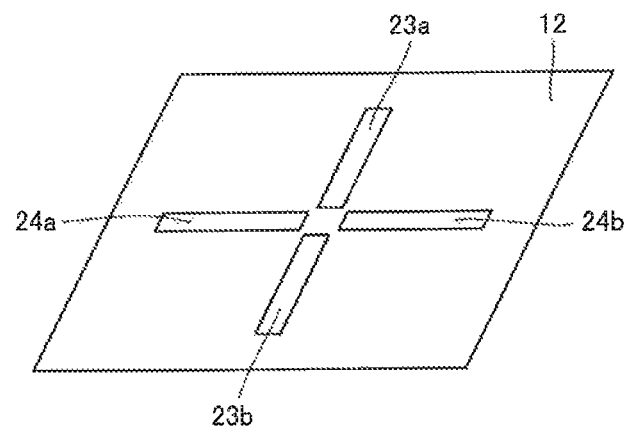
FIG. 19 is a perspective view illustrating a solid electrolytic layer in the second embodiment of the present invention.
Figure 20:
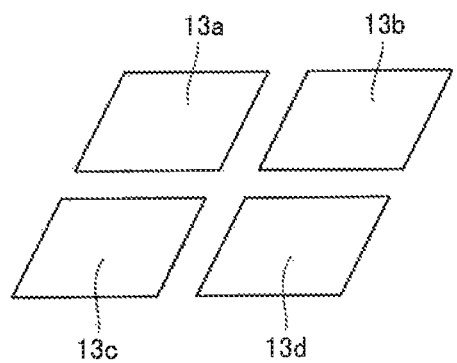
FIG. 20 is a perspective view illustrating an air electrode layer in the second embodiment of the present invention.

More specifically, the green sheet of the fuel electrode layers 11a to 11d having a shape illustrated in FIG. 18 was made, the green sheet of the solid electrolytic layer 12 having a shape illustrated in FIG. 19 was made, and the green sheet of the air electrode layers 13a to 13d having a shape illustrated in FIG. 20 were made. In addition, elongated through holes were formed in the green sheet of the solid electrolytic layer 12 as illustrated in FIG. 19 to form the fuel gas supply paths 23a and 23b and the air supply paths 24a and 24b.

The green sheets of the parts 20c, 20a, and 20b in the solid electrolytic fuel battery support structure 20 made as described above were sequentially laminated, and the green sheets of the air electrode layers 13a and 13b, the solid electrolytic layer 12, and the fuel electrode layers 11a and 11b were further sequentially laminated to fit in them. After that, as illustrated in FIG. 2, the four solid electrolytic fuel battery unit modules each composed of the solid electrolytic fuel battery support structure 20 (thickness of the cell separation part 21a after firing: 100 µm), the air electrode layer 13 (thickness after firing: 200 µm), the solid electrolytic layer 12 (thickness after firing: 20 µm), and the fuel electrode layer 11 (thickness after firing: 200 µm) were laminated, and the part 20a of the solid electrolytic fuel battery support structure 20 not having the gas supply path was laminated on the top. This laminated body was pressed by cold isostatic processing, similar to the first working example. This pressed body was subjected to a degreasing process, and then fired, similar to the first working example. In this way, the sample of the solid electrolytic fuel battery in the second working example (plane area: 85 mm×85 mm) was made.

Then, as illustrated in FIG. 2, the power collecting plates 30 and 40 each made of silver and having a thickness of 20 µm were fixed onto the upper surface and the lower surface, respectively of the sample of the solid electrolytic fuel battery made as described above in the second working example.

Comparison Example

Figure 21:
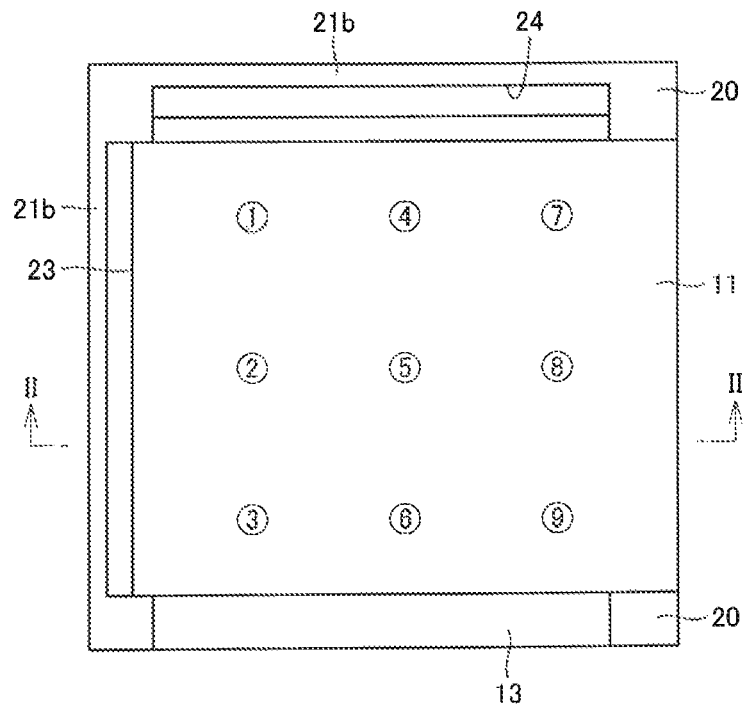
FIG. 21 is a plan view illustrating a schematic configuration of a unit module of a solid electrolytic fuel battery according to a comparison embodiment of the present invention.

First, material powder were prepared for the fuel electrode layer 11, the solid electrolytic layer 12, the air electrode layer 13, and parts 20a to 20c as members constituting the unit module of the solid electrolytic fuel battery illustrated in FIGS. 1, 2, and 21, similar to the first working example.

In addition, FIG. 21 is a plan view illustrating a schematic configuration of the unit module in FIG. 1. The cross-sectional surface taken along a line II-II in FIG. 21 corresponds to FIGS. 1 and 2. According to a solid electrolytic fuel battery as a comparison embodiment of the present invention, as illustrated in FIG. 21, a gas supply path structure 21b has a fuel gas supply path 23 arranged so as to be in contact with a side surface of the fuel electrode layer 11 on one side in each of the cells 10 and serving as an anode gas supply path to supply a fuel gas, and an air supply path 24 arranged so as to be in contact with a side surface of the air electrode layer 13 on one side and serving as a cathode gas supply path to supply air. In FIG. 21, the fuel gas flows rightward from the fuel gas supply path 23 arranged on the left, and the air flows downward from the air supply path 24 arranged on the upper side. In this way, according to a solid electrolytic fuel battery 100 in this comparison embodiment, the fuel gas supply path 23 and the air supply path 24 are arranged outside a battery structure part.

Figure 25:
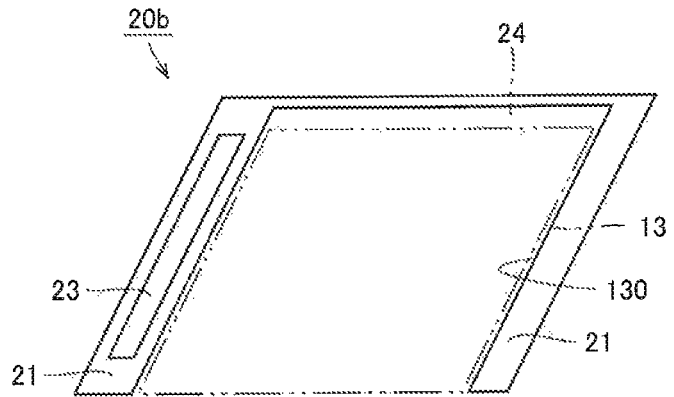
FIG. 25 is a perspective view partially illustrating a support structure including the anode gas supply path in the comparison embodiment of the present invention.
Figure 26:
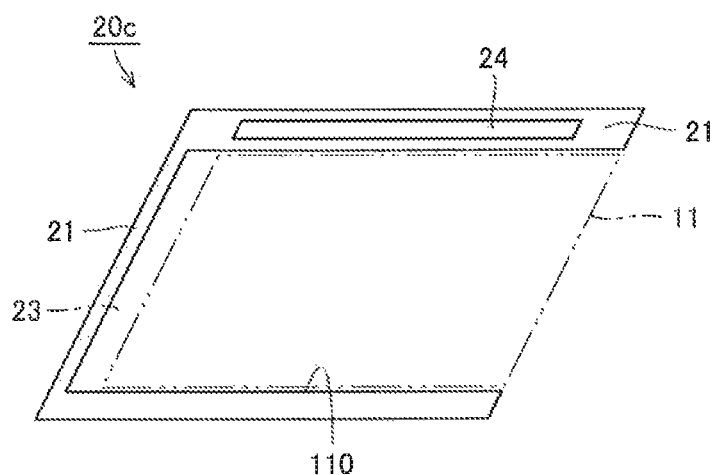
FIG. 26 is a perspective view partially illustrating a support structure including the cathode gas supply path in the comparison embodiment of the present invention.

With the material prepared as described above, first, green sheets having three kinds of shapes were made as follows for parts 20a, 20b, and 20c constituting the solid electrolytic fuel battery support structure 20 as illustrated in FIG. 2. The part 20a was constituted by sequentially laminating a part 20a2 (refer to FIG. 23), a part 20a1 (refer to FIG. 22), and a part 20a3 (FIG. 24), from a bottom. The part 20b is illustrated in FIG. 25. The part 20c is illustrated in FIG. 26.

The green sheets for the parts 20a1, 20a2, and 20a3 were made similar to the first working example.

Figure 22:
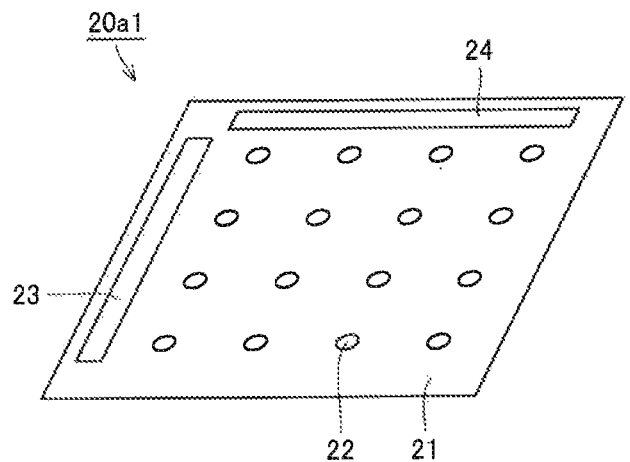
FIG. 22 is a perspective view partially illustrating a support structure including a cell separation part, and anode and cathode gas supply paths in the comparison embodiment of the present invention.
Figure 23:
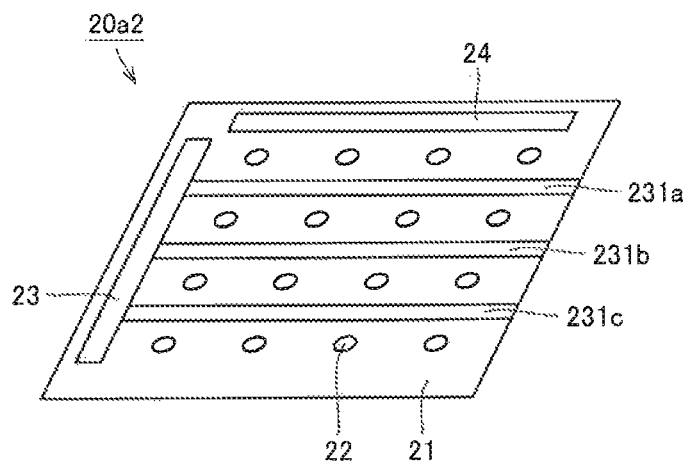
FIG. 23 is a perspective view partially illustrating a support structure including the cell separation part, the anode gas supply path, and a flow path in the comparison embodiment of the present invention.
Figure 24:
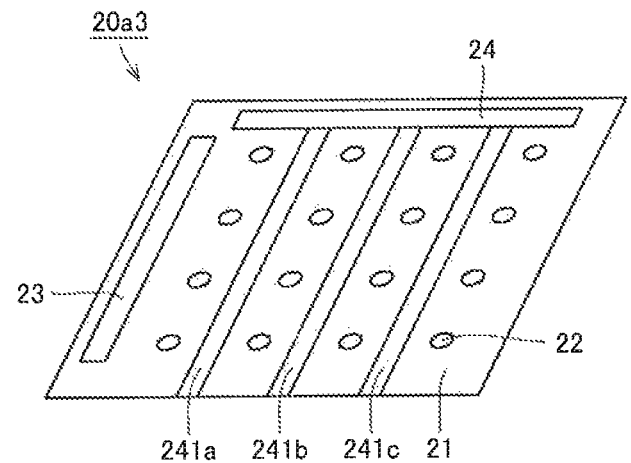
FIG. 24 is a perspective view partially illustrating a support structure including the cell separation part, the cathode gas supply path, and a flow path in the comparison embodiment of the present invention.

In the green sheets for the parts 20a1, 20a2, and 20a3, as illustrated in FIGS. 22, 23, and 24, a conductive paste filled layer was made to form each of the electric conductors 22 in the electric insulator 21, similar to the first working example.

Furthermore, as illustrated in FIGS. 22, 23, and 24, in the parts 20a1, 20a2, and 20a3, elongated through holes were formed to form the fuel gas supply path 23 and the air supply path 24.

In the green sheet of the part 20a2, as illustrated in FIG. 23, fuel gas flow path formation layers 231a, 231b, and 231c were formed of polyethylene terephthalate (PET) to be connected to the through holes to form the fuel gas supply path 23. After these fuel gas flow path formation layers 231a, 231b, and 231c have disappeared after firing, they are connected to the fuel gas supply path 23 to supply the fuel gas, and become fuel gas flow paths to send the fuel gas to the fuel electrode layer 11.

In the green sheet of the part 20a3, as illustrated in FIG. 24, air flow path formation layers 241a, 241b, and 241c were formed of polyethylene terephthalate (PET) to be connected to the through hole to form the air supply path 24. After these air flow path formation layers 241a, 241b, and 241c have disappeared after firing, they are connected to the air supply path 24 to supply the air, and become air flow paths to send the air to the air electrode layer 13.

Then, a green sheet of the part 20b was made similar to the first working example.

For the green sheet of the part 20b, as illustrated in FIG. 25, a roughly U-shaped sheet of the electric insulator 21 was formed so that the green sheet of the air electrode layer 13 can fit with a space left for the air supply path 24 illustrated in FIG. 21. In addition, an elongated through hole was formed in the green sheet of the part 20b to form the fuel gas supply path 23 in the electric insulator 21 as illustrated in FIGS. 2 and 12.

Thus, a green sheet of the part 20c was made similar to the first working example.

For the green sheet of the part 20c, as illustrated in FIG. 26, a roughly U-shaped sheet of the electric insulator 21 was formed so that the green sheet of the fuel electrode layer 11 can fit with a space left for the fuel gas supply path 23 illustrated in FIG. 21. In addition, an elongated through hole was formed in the green sheet of the part 20c to form the air supply path 24 in the electric insulator 21 as illustrated in FIG. 21.

Subsequently, green sheets were made for the air electrode layer 13 and the fuel electrode layer 11 illustrated in FIG. 21, and the solid electrolytic layer 12 illustrated in FIGS. 1 and 2, similar to the first working example.

Figure 27:
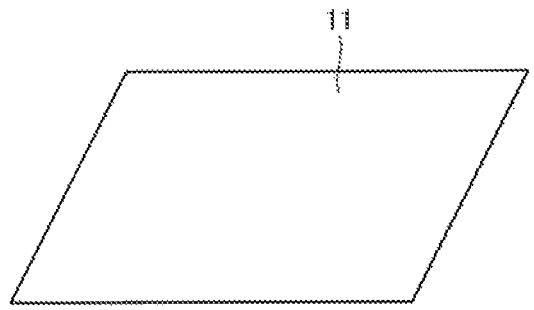
FIG. 27 is a perspective view illustrating a fuel electrode layer in the comparison embodiment of the present invention.
Figure 28:
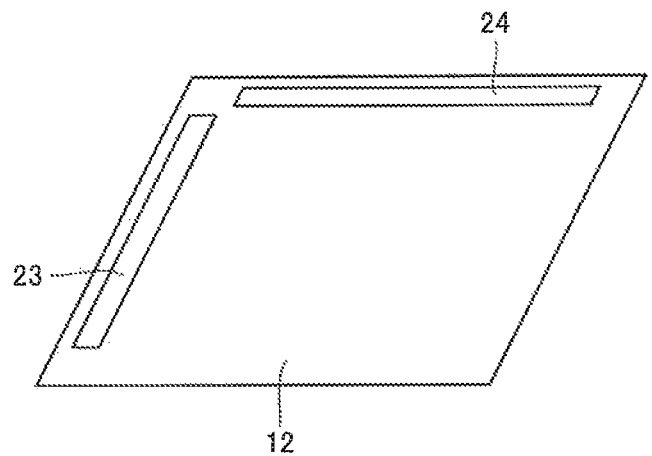
FIG. 28 is a perspective view illustrating a solid electrolytic layer in the comparison embodiment of the present invention.
Figure 29:
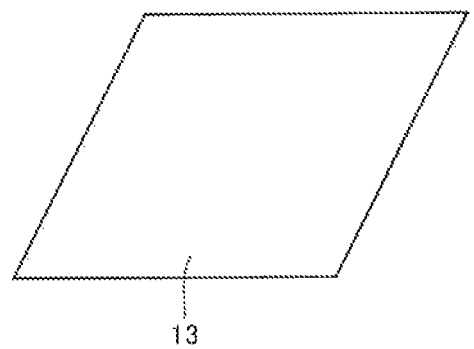
FIG. 29 is a perspective view illustrating an air electrode layer in the comparison embodiment of the present invention.

More specifically, the green sheets of the fuel electrode layer 11 having a shape illustrated in FIG. 27 was made, the green sheet of the solid electrolytic layer 12 having a shape illustrated in FIG. 28 was made, and the green sheet of the air electrode layer 13 having a shape illustrated in FIG. 29 were made. In addition, as illustrated in FIG. 28, elongated through holes were formed in the green sheet of the solid electrolytic layer 12 to form the fuel gas supply path 23 and the air supply path 24.

The green sheets of the parts 20c, 20a, and 20b in the solid electrolytic fuel battery support structure 20 made as described above were sequentially laminated, and the green sheets of the air electrode layer 13, the solid electrolytic layer 12, and the fuel electrode layer 11 were further sequentially laminated to fit in them. After that, as illustrated in FIG. 2, the four solid electrolytic fuel battery unit modules each composed of the solid electrolytic fuel battery support structure 20 (thickness of the cell separation part 21a after firing: 100 µm), the air electrode layer 13 (thickness after firing: 200 µm), the solid electrolytic layer 12, and the fuel electrode layer 11 (thickness after firing: 200 µm) were laminated, and the part 20a of the solid electrolytic fuel battery support structure 20 not having the gas supply path was laminated on the top. This laminated body was pressed by cold isostatic processing, similar to the first working example. This pressed body was subjected to a degreasing process, and then fired, similar to the first working example. In this way, the sample of the solid electrolytic fuel battery in the comparison example (plane area: 85 mm×85 mm) was made.

Then, as illustrated in FIG. 2, the power collecting plates 30 and 40 each made of silver and having a thickness of 20 µm were fixed onto the upper surface and the lower surface, respectively of the sample of the solid electrolytic fuel battery made as described above in the comparison example.

The obtained samples of the fuel batteries in the first and second working examples and the comparison example were heated to 800° C., and a hydrogen gas containing 5% of water vapor, and air were supplied through the fuel gas supply paths 23 (23*a* and 23*b*) and the air supply paths 24 (24*a* and 24*b*), respectively to generate a power. In addition, by increasing supply amounts of the hydrogen gas and the air, a current density obtained by the power generation was increased.

Figure 30:
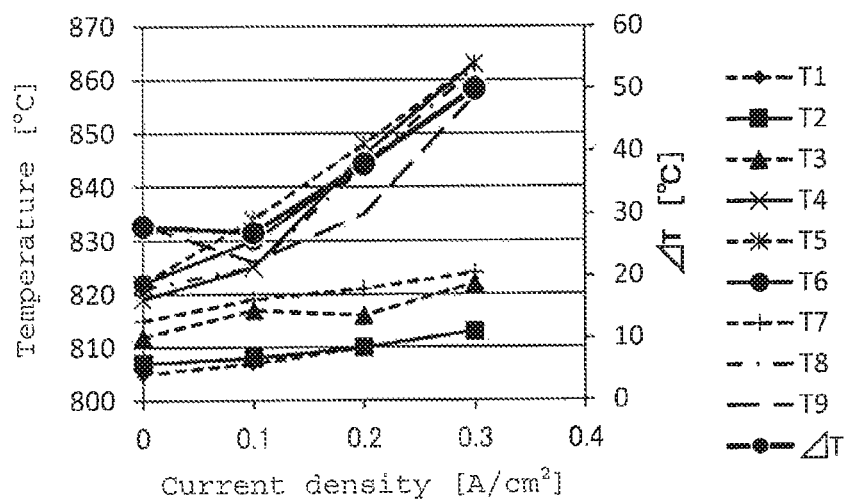
FIG. 30 is a view illustrating a temperature distribution in the battery structure part due to heat generated during power generation in the solid electrolytic fuel battery in a first working example of the present invention.

With respect to each current density [A/cm$^2$], temperatures were measured in the fuel batteries of the samples in the first and second working examples and the comparison example. In addition, the temperatures were measured in a position M illustrated in FIG. 2 in a vertical direction, and positions represented by circled numbers in FIG. 3 in the first working example, in FIG. 12 in the second working example, and in FIG. 21 in the comparison example in planes. The measured results are shown in FIG. 30 in the first working example, in FIG. 31 in the second working example, and in FIG. 32 in the comparison example. Furthermore, a temperature difference ΔT between a maximum temperature and a minimum temperature is also shown in FIGS. 31 to 33.

According to the first working example, referring to FIG. 30, it is found that the temperature difference is kept as small as about 50° C. even when the current density is increased to 0.3 A/cm$^2$, and the cell does not cause a damage such as crack during the power generation.

Figure 31:
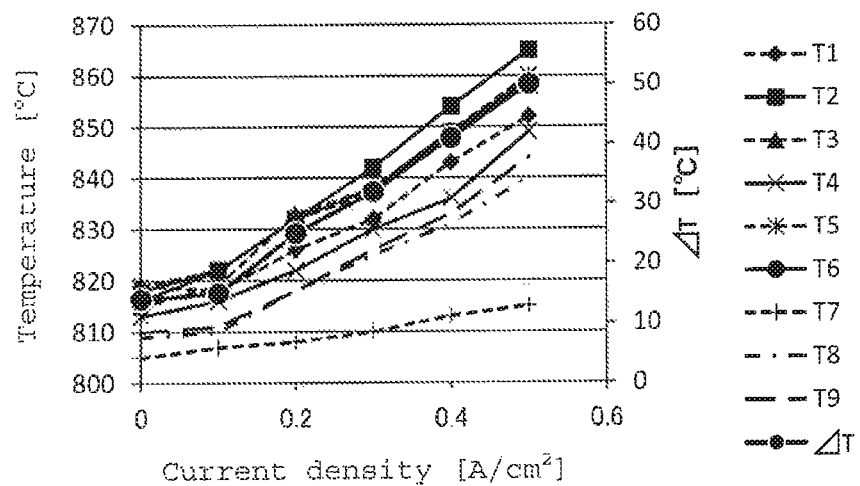
FIG. 31 is a view illustrating a temperature distribution in the battery structure part due to heat generated during power generation in the solid electrolytic fuel battery in a second working example of the present invention.

According to the second working example, referring to FIG. 31, the temperature difference is kept as small as about 30° C. even when the current density is increased to 0.3 A/cm$^2$, and the temperature difference is kept as small as about 50° C. even when the current density is increased to 0.5 A/cm$^2$, and the cell does not cause a damage such as crack during the power generation.

Figure 32:
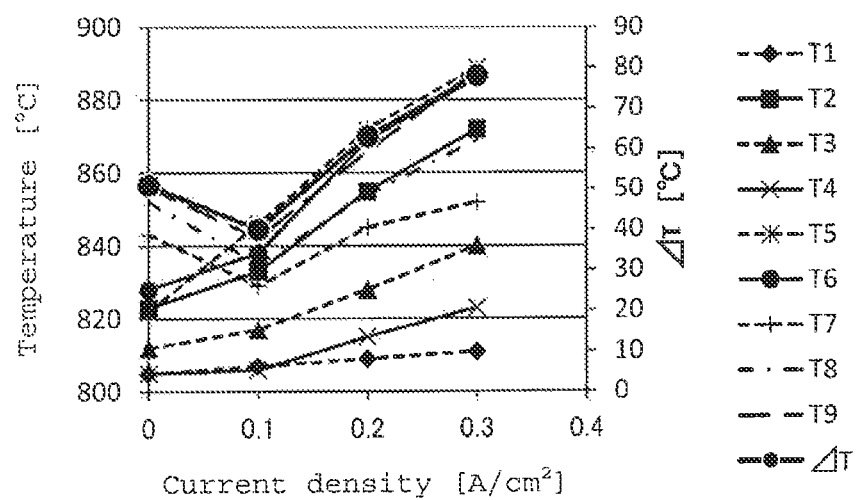
FIG. 32 is a view illustrating a temperature distribution in the battery structure part due to heat generated during power generation in the solid electrolytic fuel battery in a comparison example of the present invention.

Compared with the first and second working examples, according to the comparison example, referring to FIG. 32, it is found that the temperature difference is about 80° C. when the current density is increased to 0.3 A/cm$^2$, and the cell causes a damage such as crack.

Based on the above results, according to the first working example, the air flows outward from the air supply path 24 (FIG. 3) arranged in the inside of the battery structure part, that is, from the inside to both end sides of the cell, so that it is possible to prevent a local temperature increase in the cell separation part 21*a* functioning as the separator and the cell due to the heat generated during the power generation, and the temperature difference can be kept low. As a result, a thermal stress generated in the cell separation part 21*a* is reduced, so that the cell separation part 21*a* and the cell can be prevented from being destroyed.

Furthermore, according to the first working example, since the air flows from the inside to the outside of the cell, it serves as a gas for cooling down the heat generated during the power generation. Therefore, the temperature can be prevented from increasing in the inside of the battery structure part.

Furthermore, according to the first working example, the air electrode layer serving as a high-temperature part is divided into the air electrode layer 13*a* and the air electrode layer 13*b* by the air supply path 24 arranged in the inside of the battery structure part, so that points where the heat is generated during the power generation can be dispersed, and the heat can be dissipated in two directions. Thus, the temperature can be further prevented from locally increasing in the inside of the battery structure part, and the temperature difference can be further kept small.

According to the second working example, the hydrogen and the air flow outward from the fuel gas supply paths 23*a* and 23*b* and the air supply paths 24*a* and 24*b* (FIG. 12) arranged in the inside of the battery structure part, respectively, that is, from the inside to the outer peripheral ends of the cell, so that it is possible to prevent the local temperature increase in the cell separation part 21*a* functioning as the separator and the cell due to the heat generated during the power generation, and the temperature difference can be kept small. As a result, a thermal stress generated in the cell separation part 21*a* can be reduced, so that the cell separation part 21*a* and the cell can be prevented from being destroyed.

Furthermore, according to the second working example, since the air flows from the inside to the outside of the cell, it serves as a gas for cooling the heat generated during the power generation. Therefore, the temperature can be prevented from increasing in the inside of the battery structure part.

Furthermore, according to the second working example, the fuel electrode layer and the air electrode layer serving as the high-temperature parts are divided into the four fuel electrode layers 11*a* to 11*d*, and the four air electrode layers 13*a* to 13*d* by the fuel gas supply paths 23*a* and 23*b* and the air supply paths 24*a* and 24*b* arranged in the inside of the battery structure part, respectively, so that points where the heat is generated during the power generation can be dispersed, and the heat can be dissipated in four directions. Thus, the temperature can be further prevented from locally increasing in the inside of the battery structure part, and the temperature difference can be further kept small.

The above embodiments and working examples are to be considered illustrative and not restrictive in all respects. The scope of the present invention is not limited to the above embodiments and working examples, but defined by claims, and includes all kinds of modifications and variations within the meaning and scope equivalent to claims.

According to the present invention, the local temperature increase due to the power generation can be prevented from generating in the separator and the cell, and the separator and the cell can be prevented from being destroyed, so that the present invention can be applied to various types of solid electrolytic fuel batteries each having a separator composed of a ceramic material.

DESCRIPTION OF REFERENCE SYMBOLS

1 Unit module of solid electrolytic fuel battery
11, 11*a* to 11*d* Fuel electrode layer
12 Solid electrolytic layer
13, 13*a* to 13*d* Air electrode layer
20 Solid electrolytic fuel battery support structure
21 Electric insulator
21*a* Cell separation part 21*b* Gas supply path structure part
22 Electric conductor
23, 23*a*, 23*b* Fuel gas supply path
24, 24*ak* 24*b* Air supply path
100 Solid electrolytic fuel battery

The invention claimed is:

1. A solid electrolytic fuel battery comprising:
a battery structure part including a plurality of cells each having an anode, a solid electrolyte, and a cathode;
a cell separation part arranged between adjacent cells of the plurality of cells, and formed of a material containing ceramics; and
a gas supply path structure part having an anode gas supply path to supply an anode gas to each of the cells, and a cathode gas supply path to supply a cathode gas to each of the cells, wherein
at least one of the anode gas supply path and the cathode gas supply path is arranged in an inside of the battery structure part and the solid electrolyte, and the inside of the battery structure part and the solid electrolyte is an inner side away from a side surface of the battery structure part and the solid electrolyte by more than $\frac{1}{3}$ of a width dimension of the battery structure part and the solid electrolyte, and the gas supply structure part and the solid electrolyte are integral.

2. The solid electrolytic fuel battery according to claim 1, wherein the gas supply structure part and the cell separation part are integral.

3. The solid electrolytic fuel battery according to claim 1, wherein the cell separation part includes an electric insulator formed of ceramics for separating the anode gas from the cathode gas to be supplied to each of the plurality of cells.

4. The solid electrolytic fuel battery according to claim 3, wherein the cell separation part further includes an electric conductor in the electric insulator for electrically connecting the plurality of cells to each other.

5. The solid electrolytic fuel battery according to claim 1, wherein at least one of the anode gas supply path and the cathode gas supply path is an elongated opening.

6. The solid electrolytic fuel battery according to claim 1, wherein at least one of the anode gas supply path and the cathode gas supply path includes a plurality of openings arranged at intervals in a direction.

* * * * *